(12) United States Patent
Sakurai et al.

(10) Patent No.: US 11,878,361 B2
(45) Date of Patent: Jan. 23, 2024

(54) ULTRASONIC JOINING HORN

(71) Applicant: PRIME PLANET ENERGY & SOLUTIONS, INC., Tokyo (JP)

(72) Inventors: Takahiro Sakurai, Nagoya (JP); Kosuke Suzuki, Toyota (JP); Kota Ohata, Toyota (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 0 days.

(21) Appl. No.: 17/876,020

(22) Filed: Jul. 28, 2022

(65) Prior Publication Data
US 2023/0045159 A1 Feb. 9, 2023

(30) Foreign Application Priority Data

Aug. 6, 2021 (JP) ................................ 2021-130090

(51) Int. Cl.
*B23K 20/10* (2006.01)
(52) U.S. Cl.
CPC ................................ *B23K 20/106* (2013.01)
(58) Field of Classification Search
CPC .................................................. B23K 20/106
See application file for complete search history.

(56) References Cited

U.S. PATENT DOCUMENTS

| | | | | |
|---|---|---|---|---|
| 7,793,815 B2* | 9/2010 | Shimizu | ................. | B23K 20/10 228/110.1 |
| 9,259,799 B2* | 2/2016 | Kim | ........................ | B23K 1/06 |
| 2011/0248069 A1* | 10/2011 | Khakhalev | ........... | B23K 20/106 228/110.1 |
| 2013/0213552 A1* | 8/2013 | Kelch | ............... | B29C 66/81264 156/580.2 |
| 2014/0190638 A1* | 7/2014 | Hull | ........................ | B29C 66/43 156/580.2 |
| 2014/0255768 A1 | 9/2014 | Jang | | |
| 2016/0043360 A1* | 2/2016 | Byun | ................... | B23K 20/106 156/580.2 |
| 2017/0018752 A1* | 1/2017 | Kim | ..................... | H01M 50/178 |

(Continued)

FOREIGN PATENT DOCUMENTS

| JP | 2007-330851 | 12/2007 |
|---|---|---|
| JP | 2012-125801 A | 7/2012 |

(Continued)

*Primary Examiner* — Erin B Saad
*Assistant Examiner* — Carlos J Gamino
(74) *Attorney, Agent, or Firm* — Finnegan, Henderson, Farabow, Garrett & Dunner, LLP

(57) ABSTRACT

An ultrasonic joining horn disclosed herein can generate ultrasonic vibration in a predetermined vibration direction and includes a base portion, a stand portion that rises from an upper surface of the base portion, and a pressure contact portion formed of a plurality of protrusions that protrude from an upper surface of the stand portion. Each of the protrusions is formed into a pyramid shape or a truncated pyramid shape, the protrusions are arrayed, and when viewed from top, at least a portion of a peripheral edge of a portion in which the protrusions are arrayed has a zigzag shape. The zigzag portion is formed along at least one of the vibration direction and a perpendicular direction to the vibration direction. The upper surface of the base portion has an exposed surface on which the stand portion is not formed.

7 Claims, 11 Drawing Sheets

(56) References Cited

U.S. PATENT DOCUMENTS

| | | | |
|---|---|---|---|
| 2018/0085847 A1* | 3/2018 | Sato | B23K 20/10 |
| 2019/0375166 A1 | 12/2019 | De Cuyper et al. | |
| 2020/0227877 A1 | 7/2020 | Nakamura et al. | |
| 2021/0028562 A1* | 1/2021 | Nakamura | H01B 7/108 |
| 2022/0088708 A1* | 3/2022 | Park | B23K 26/346 |
| 2022/0347786 A1* | 11/2022 | Neddermann | B23K 20/106 |

FOREIGN PATENT DOCUMENTS

| | | |
|---|---|---|
| JP | 5570447 B2 * | 8/2014 |
| JP | 2015-139780 A | 8/2015 |
| JP | 2016-052670 A | 4/2016 |
| JP | 2018-051591 A | 4/2018 |
| JP | 2018-069308 | 5/2018 |
| JP | 2019-533591 A | 11/2019 |
| KR | 100939975 B1 * | 2/2010 |
| WO | WO 2013/105361 A1 | 5/2015 |
| WO | WO-2019161902 A1 * | 8/2019 ............. B23K 20/10 |

\* cited by examiner

VIBRATION DIRECTION

VIBRATION DIRECTION

VIBRATION DIRECTION

ULTRASONIC JOINING HORN

CROSS REFERENCE TO RELATED APPLICATIONS

The present application claims priority from Japanese Patent Application No. 2021-130090 filed on Aug. 6, 2021, which is incorporated by reference herein in its entirety.

BACKGROUND

The present disclosure relates to an ultrasonic joining horn.

Conventionally, as one of methods for joining metal members, ultrasonic joining has been known. For example, Japanese Laid-open Patent Publication No, 2007-330851 discloses a horn used for ultrasonic joining. The horn has a plurality of protrusions on a surface that pressurizes workpieces to be joined and ultrasonically vibrates the workpieces to be joined while pressing the workpieces via the plurality of protrusions, thereby realizing ultrasonic joining. The protrusions are hexagonal pyramidal protrusions and are configured such that an opposing direction of a pair of surfaces of each of the protrusions that are opposed to each other is perpendicular to a vibration direction. According to the horn, occurrence and spreading of burrs can be suppressed by the horn, and also, a change in shape due to wear of the protrusions can be made small.

Japanese Laid-open Patent Publication No. 2018-69308 discloses an ultrasonic joining tool that joins metal members directly to each other or a metal electrode on which a circuit or the like is provided and a reed shaped metal plate through which electricity flows directly to each other. The ultrasonic joining tool includes a tool joining portion that presses a plurality of metal members and, in the tool joining portion, protrusions each of which has a quadrangular pyramid shape with a rectangular flat surface are provided in a pressure contact portion that contacts the metal members. Each of the protrusions is configured to widen toward a horn that transmits ultrasonic vibration and a rectangular flat surface of the pressure contact portion of the protrusion is in parallel to an ultrasonic vibration direction. Thus, in a step of ultrasonic joining, it is enabled to achieve stable joining over a long time.

SUMMARY

In ultrasonic joining, burrs are formed around a portion (contact portion) in which a horn is pressed against workpieces to be joined. The burrs are generated by shaving of the one of the workpieces to be joined by the horn and are formed in a disorderly manner around the contact portion. When a state where the burrs have been formed in the workpiece to be joined is kept, the burrs can be mixed in as foreign matters when being peeled off in an electronic device or the like including the workpieces to be joined, and therefore, the burrs can be a cause for a failure of the electronic device or the like. Therefore, in general, the burrs are removed by washing treatment or the like. Such additional processing requires additional cost and process time, and therefore, is not preferable.

Incidentally, the present inventor has examined providing a recessed portion in a workpiece to be joined and performing ultrasonic joining in the recessed portion to retain the burrs inside the recessed portion. If the burrs can be retained inside the recessed portion, additional processing of washing treatment for the burrs or the like can be omitted by sealing the recessed portion by some other member. As one approach used for retaining the burrs inside a recessed portion, development of a mechanism that controls a height of the burrs is desired.

In view of the foregoing, the present disclosure has been devised and it is therefore an object of the present disclosure to provide an ultrasonic joining horn that can control a height of burrs that are generated during ultrasonic joining.

In order to realize the object, an ultrasonic joining horn disclosed herein can generate ultrasonic vibration in a predetermined direction and includes a base portion, a stand portion that rises from an upper surface of the base portion, and a pressure contact portion formed of a plurality of protrusions that protrude from an upper surface of the stand portion. Each of the protrusions forming the pressure contact portion is formed into a pyramid shape or a truncated pyramid shape and the protrusions are arrayed, when viewed from top, as shown in the plan view of FIG. 2, at least a portion of a peripheral edge of a portion in which the protrusions are arrayed has a zigzag shape, and the zigzag portion is formed along at least one of the vibration direction and a perpendicular direction to the vibration direction. The upper surface of the base portion has an exposed surface on which the stand portion is not formed. Throughout this specification, the expression "when viewed from top" refers to a field of view when the ultrasonic joining horn is viewed from an upper side (designated by "U" in FIG. 1) looking toward a lower side (designated by "D" in FIG. 1).

According to a structure described above, when viewed from top, the peripheral edge of the portion of the horn in which the protrusions are arrayed has a zigzag portion, and therefore, burrs generated during ultrasonic joining are easily guided to valley portions of the zigzag portion. The horn having the structure includes the stand portion between the base portion and the pressure contact portion and there is the exposed surface on which the stand portion is not formed in the base portion. Thus, the burrs generated due to ultrasonic joining (in particular, the burrs that have been guided to the valley portions of the zigzag portion) are pressed by the exposed surface from a height direction, and therefore, a height of the burrs can be controlled.

According to one embodiment of a horn disclosed herein, at least a portion of a peripheral wall of the stand portion is formed in a corrugated plate shape, and the portion having a corrugated plate shape corresponds to the zigzag portion of the peripheral edge of the portion in which the protrusions are arrayed. Thus, the burrs that have been guided to the valley portions of the zig zag portion of the peripheral edge of the portion in which the protrusions are arrayed can smoothly enter a recessed space of the corrugated plate shape of the peripheral wall of the stand portion. As a result, spreading of the burrs can be preferably controlled and the height of the burrs can be more efficiently controlled.

According to another embodiment of the horn disclosed herein, when viewed from top, a recessed portion of the portion having a corrugated plate shape formed in the peripheral wall of the stand portion is formed in a circular arc shape. Thus, the burrs having a sharp tip are less likely to be formed, so that sticking of the burrs into the horn can be reduced and the burrs can be more efficiently controlled.

According to still another embodiment of the horn disclosed herein, the protrusions are disposed so as to adjoin to each other without a flat groove between every adjacent ones of the protrusions, Thus, entering of the burrs between the protrusions can be suppressed and the burrs can be more preferably controlled.

According to still another embodiment of the horn disclosed herein, when viewed from top, the peripheral edge of the portion in which the protrusions are arrayed does not have any one of a side extending in the vibration direction and a side extending in the perpendicular direction to the vibration direction. Thus, spreading of the burrs in a disorderly manner can be suppressed and the height of the burrs can be more preferably controlled.

According to still another embodiment of the horn disclosed herein, when viewed from top, the exposed surface is provided in an entire periphery of the stand portion. Thus, the height of the burrs can be preferably controlled in any direction around an ultrasonic joining portion.

According to still another embodiment of the horn disclosed herein, a boundary portion between the upper surface of the base portion and the peripheral wall of the stand portion is formed in a slope shape. Thus, the burrs are less likely to stick in the exposed surface.

According to still another embodiment of the horn disclosed herein, a ratio between a height T1 of the stand portion from the upper surface of the base portion and a height T2 of the protrusions from the upper surface of the stand portion is 5:1 to 1:1. Thus, the height of the burrs can be more preferably controlled.

DETAILED DESCRIPTION

Figure 1:
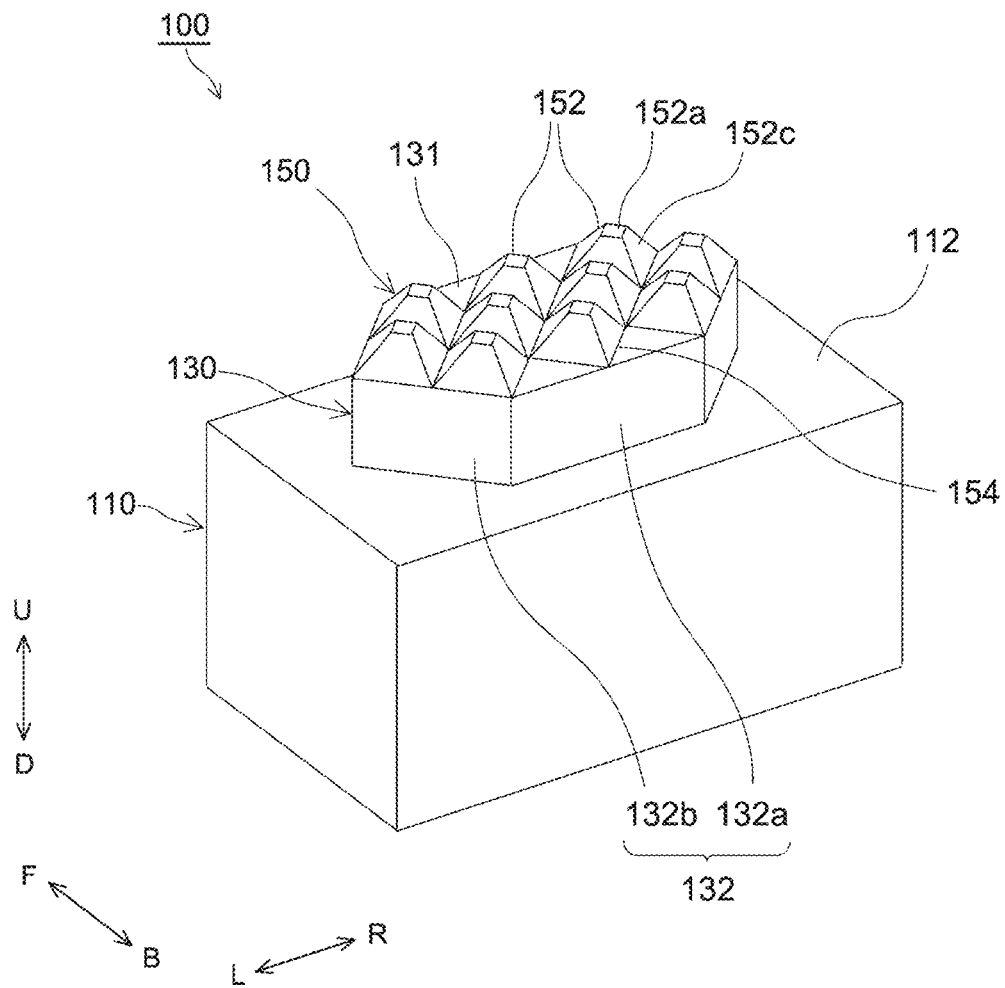
FIG. 1 is a perspective view schematically illustrating a structure of a horn according to one embodiment.

An embodiment of an ultrasonic joining horn (which will be also hereinafter simply referred to as a "horn") disclosed herein and a terminal component used for a secondary battery as an example of an article preferably produced using the horn disclosed herein will be described below. Matters other than matters specifically mentioned in this specification and necessary for carrying out the present disclosure can be understood as design matters for those skilled in the art based on the related art in the related field. Contents of a technology disclosed herein can be carried out based on contents disclosed in this specification and the common general technical knowledge in the field.

The accompanying drawings are schematic and dimension relations (length, width, thickness, or the like) in the drawings do not necessarily reflect actual dimensional relations. In the following drawings, members/portions that have the same effect may be denoted by the same sign and the overlapping description may be omitted or simplified.

In this specification, the notation "A to B" (herein each of A and B is an arbitrary numerical value) that indicates a numerical range means "A or more and B or less" (including a range that exceeds A and is lower than B), similar to a general interpretation.

As used herein, a term "secondary battery" refers to overall storage devices in which charge carriers move between a pair of electrodes (a positive electrode and a negative electrode) via an electrolyte and thus a charging and discharging reaction occurs. Such secondary batteries include not only so-called storage batteries, such as a lithium-ion secondary battery, a nickel hydrogen battery, a nickel cadmium battery, or the like, but also capacitors, such as an electric double-layered capacitor or the like.

Figure 2:
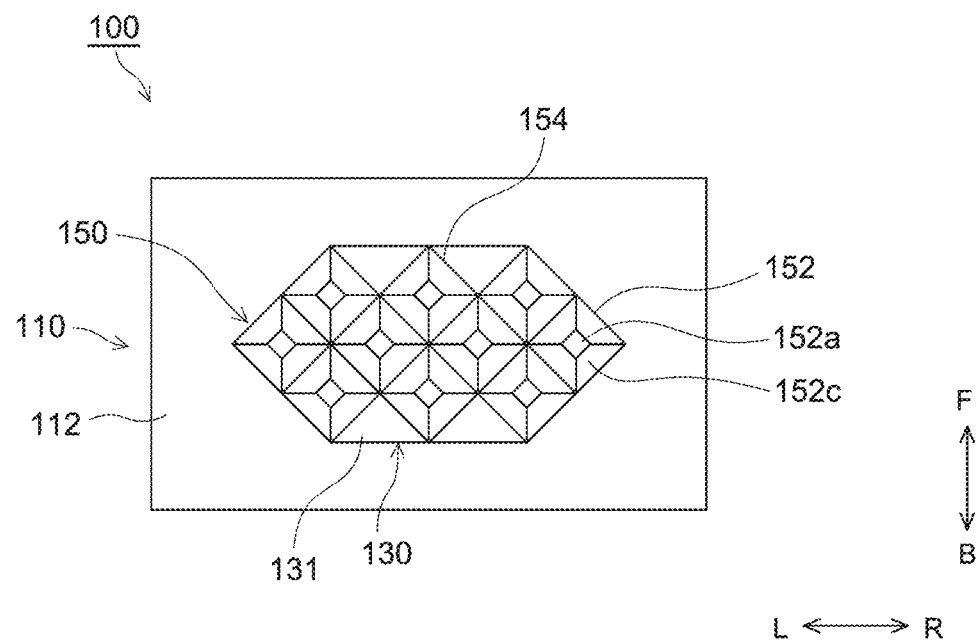
FIG. 2 is a plan view schematically illustrating the structure of the horn according to one embodiment.
Figure 3:
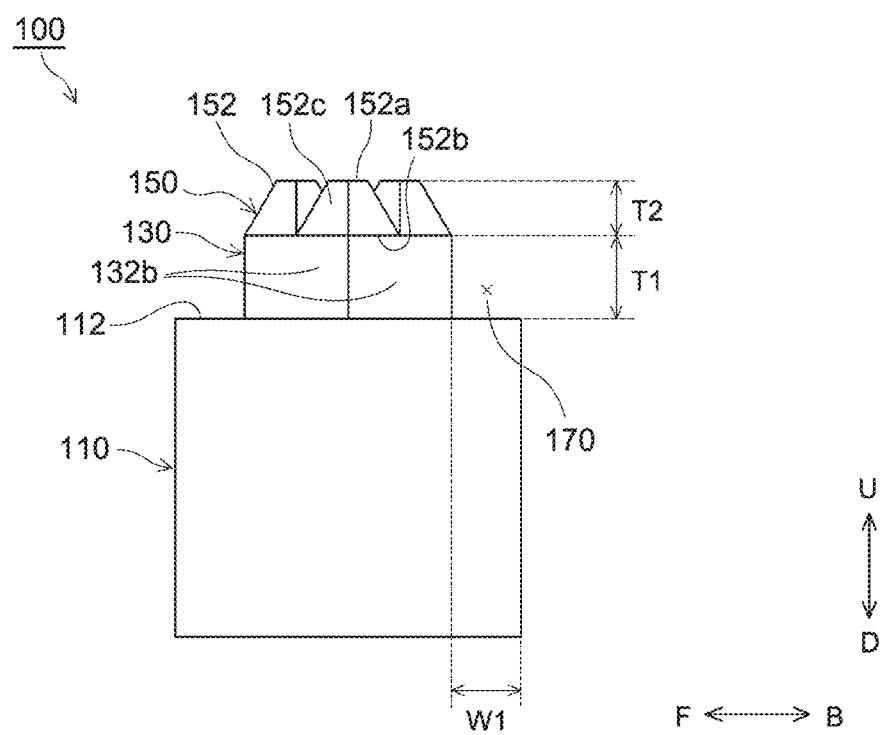
FIG. 3 is a side view schematically illustrating the structure of the horn according to one embodiment.

One embodiment of a horn 100 disclosed herein are illustrated inn FIG. 1 to FIG. 3. FIG. 1 is a perspective view schematically illustrating a structure of the horn 100, FIG. 2 is a plan view schematically illustrating the structure of the horn 100. FIG. 3 is a side view schematically illustrating the structure of the horn 100. In the following description, reference signs F, B, L, R, U, and D in the drawings indicate front, rear, left, right, up, and down, respectively. However, these directions are used herein merely for convenience of description, and do not limit setting modes of the horn 100.

As illustrated in FIG. 1, the horn 100 includes a base portion 110, a stand portion 130, and a pressure contact portion 150. The horn 100 is mounted on an ultrasonic oscillator (not illustrated), and thus, can generate ultrasonic vibration in a predetermined direction. Thus, the horn 100 can transmit ultrasonic vibration to workpieces to be joined, so that ultrasonic joining can be realized. In the following description, it is assumed that a direction of ultrasonic vibration (which will be also hereinafter simply referred to as a "vibration direction") is a front-rear direction. In this specification, similar to a general interpretation, "when viewed from top" is a field of view when the horn 100 is viewed from an upper side (a U side in FIG. 1) toward a lower side (a D side in FIG. 1), that is, in other words, a field of view when the horn 100 is viewed from a pressure contact portion 150 side toward a base portion 110 side.

The base portion 110 is a portion connected to the ultrasonic oscillator. As illustrated in FIG. 2, herein, the base portion 110 has a rectangular surface when viewed from top. The stand portion 130 is formed so as to rise from the surface (upper surface) of the base portion 110. When viewed from top, the upper surface of the base portion 110 has a larger area than that of the stand portion 130 and has an exposed surface 112 on which the stand portion 130 is not formed. In this embodiment, the base portion 110 is formed in a rectangular parallelopiped shape but there is no particular limitation on an entire shape of the base portion 110 if the base portion 110 has an upper surface from which the stand portion 130 rises. There is also no particular limitation on a shape of the upper surface of the base portion 110 when viewed from top. The shape of the upper surface of the base portion 110 may be, for example, a polygonal shape, a circular shape, an elliptical shape, or the like. The base portion 110 may be formed of a material conventionally used for a horn and, for example, a super hard alloy, die steel, high speed steel, or the like can be used.

The stand portion 130 is a portion that rises from the surface of the base portion 110 and exists between the base portion 110 and the pressure contact portion 150, As illustrated in FIG. 2, when viewed from top, the stand portion 130 is formed in a smaller area range than that of the surface of the base portion 110. In this embodiment, when viewed from top, an upper surface 131 of the stand portion 130 has a larger area than that of the pressure contact portion 150. The upper surface 131 of the stand portion 130 is opposed to the upper surface of the base portion 110 each other. Herein, the upper surface 131 of the stand portion 130 is in parallel to the upper surface of the base portion 110.

As illustrated in FIG. 2, in this embodiment, an outer shape of the stand portion 130 is a hexagonal shape having long sides extending in a left-right direction when viewed from top. A peripheral wall 132 is formed between the upper surface 131 of the stand portion 130 and the upper surface of the base portion 110, The peripheral wall 132 includes a pair of broad width surfaces 132a that extend so as to be opposed to each other in the vibration direction and four narrow width surfaces 132b.

There is no particular limitation on the outer shape of the stand portion 130. The outer shape of the stand portion 130 can be a polygonal shape, a circular shape, an elliptical shape, or the like when viewed from top. The stand portion 130 can be formed of the same material as that of the base portion 110. Coat treatment of forming a diamond like carbon (DLC) coat, a titanium nitride (TiN) coat, or the like, may be performed on a portion of the stand portion 130 (for example, the upper surface 131 of the stand portion 130) that contacts with one of the workpieces to be joined. Thus, adhesion of a metal (for example, aluminum) forming the workpiece to be joined can be reduced. Moreover, wear resistance can be increased by coat treatment.

The pressure contact portion 150 is formed of a plurality of protrusions 152 that protrude from the upper surface 131 of the stand portion 130. The protrusions 152 are arrayed on the upper surface 131 of the stand portion 130. The pressure contact portion 150 is a portion that is pressed against the workpieces to be joined and transmits ultrasonic vibration to the workpieces to be joined.

As illustrated in FIG. 1 and FIG. 2, in this embodiment, the pressure contact portion 150 includes ten protrusions 152. The number of the protrusions 152 may be two or more and, for example, may be five or more, eight or more, ten or more, or twelve or more. The number of the protrusions 152 can be changed as appropriate in accordance with an area of a portion in which the workpieces to be joined are joined by ultrasonic joining or the like, and an upper limit is not particularly set. For example, the number of the protrusions 152 may be 100 or less, 50 or less, or 20 or less. The protrusions 152 may be formed of the same material as that of the base portion 110 and the stand portion 130. Similar to the stand portion 130, the coat treatment described above may be performed on the protrusions 152.

As illustrated in FIG. 1 to FIG. 3, in this embodiment, each of the protrusions 152 is formed in a truncated quadrangular pyramid shape. Herein, the protrusion 152 includes a square upper surface 152a, a square bottom surface 152b, and four side surfaces 152c formed between the upper surface 152a and the bottom surface 152b. The upper surface 152a has a smaller area than that of the bottom surface 152b. A shape of the protrusion 152 is not limited thereto and can be, for example, a pyramid shape, such as a trigonal pyramid shape, a quadrangular pyramid shape, a hexagonal pyramid shape, or the like, or a truncated pyramid shape, such as a truncated trigonal pyramid shape, a truncated hexagonal pyramid shape, or the like. The shapes of the protrusions 152 may not necessarily be all the same.

As illustrated in FIG. 2, when viewed from top, a zigzag portion 154 formed in a zigzag shape is formed in at least a portion of a peripheral edge of a portion in which the protrusions 152 are arrayed. In this embodiment, the zigzag portion 154 is formed by the bottom surfaces 152b of the three protrusions 152 disposed along a perpendicular direction to the vibration direction. As illustrated in FIG. 1 and FIG. 2, the zigzag portion 154 typically has a zigzag shape with apexes connected to each other by straight lines. However, the zigzag portion 154 is not limited thereto and, for example, may have a shape with apex portions that have been round-processed.

The zigzag portion 154 is formed by arranging at least two protrusions 152 in an array or arrays, but there is no particular limitation on the number of the protrusions 152 forming the zigzag portion 154. For example, the number of the protrusions 152 forming the zigzag portion 154 may be, for example, three or more, four or more, and five or more. The number of the protrusions 152 forming the zigzag portion 154 is limited by an area of the upper surface 131 of the stand portion 130. Although there is no particular limitation, the number of the protrusions 152 forming the zigzag portion 154 can be, for example, 20 or less, 15 or less, or ten or less.

The horn 100 includes the stand portion 130 and the exposed surface 112 of the base portion 110, and thus, can control a height of burrs generated during ultrasonic joining. Details of this mechanism are not clear, but are inferred to be as follows. Burrs are generated from a portion of the horn 100 in which the pressure contact portion 150 is pressed against the workpieces to be joined and are formed around the portion. Ultrasonic vibration is transmitted from the pressure contact portion 150 of the horn 100 to the workpieces to be joined, so that a surface of the one of the workpieces to be joined is shaved and burrs are formed to grow in a height direction (upward) and a horizontal direction. Herein, the horn 100 has the exposed surface 112, and thus, the burrs that have grown in the height direction contact the exposed surface 112, so that growth of the burrs in the height direction can be suppressed, Thus, the height of the burrs can be controlled to a height from the surface of the workpiece to be joined to the exposed surface 112.

Moreover, the horn 100 includes the zigzag portion 154 in the peripheral edge of the portion in which the protrusions 152 are arrayed, and therefore, the burrs generated during ultrasonic joining are easily guided to valley portions of the zigzag portion 154. Thus, it is possible to suppress the generated burrs from being formed and spreading in the horizontal direction, and therefore, the burrs easily grow in the height direction. The burrs that have grown in the height direction are easily suppressed by the exposed surface 112. As a result, it is possible to preferably control formation of the burrs in a disorderly manner not only in the height direction but also in the horizontal direction.

In this specification, the valley portions of the zigzag portion 154 are spaces each being located between corresponding ones of the protrusions 152 that are adjacent each other among the protrusions 152 forming the zigzag portion 154, when viewed from top.

The zigzag portion 154 is preferably formed along at least one of the vibration direction (herein, the front-rear direction) and the perpendicular direction to the vibration direction (herein, the left-right direction), when viewed from top, and specifically, the zigzag portion 154 is more preferably formed along the perpendicular direction to the vibration direction. The burrs are easily generated toward the vibration direction, and therefore, with the zigzag portion 154 formed along the perpendicular direction to the vibration direction, the burrs that are generated toward the vibration direction can be more reliably controlled.

Moreover, when viewed from top, the peripheral edge of the portion in which the protrusions 152 are arrayed preferably does not have any one of a side extending in the vibration direction and a side extending in the perpendicular direction to the vibration direction. According to a structure described above, in the vibration direction and the perpendicular direction to the vibration direction, sides (angles) connecting the upper surface 152a and the bottom surface 152b of each of the protrusions 152 contact the one of the workpieces to be joined before the side surfaces 152c of the protrusion 152 contact the workpiece to be joined, Thus, pushing out the burrs straightly in the vibration direction by the side surfaces 152c of the protrusions 152 is suppressed, so that the burrs are more easily guided to the valley portions of the zigzag portion 154.

The burrs generated during ultrasonic joining are efficiently accumulated in a burr accumulation portion 170. The burr accumulation portion 170 is, roughly speaking, a space up to a height T1 of the stand portion 130 of a space above the exposed surface 112 (see FIG. 3). The height T1 of the stand portion 130 is a height from the upper surface (the exposed surface 112) of the base portion 110.

A volume of the burr accumulation portion 170 is preferably larger than an overall volume of the protrusions 152 (the pressure contact portion 150). It is estimated that a volume of the burrs generated by ultrasonic joining corresponds to a volume of a portion of the horn 100 that digs in the one of the workpieces to be joined. That is, it is estimated that the burrs corresponding to the overall volume of the protrusions 152 can be generated. Therefore, the volume of the burr accumulation portion 170 is larger than the volume of the overall volume of the protrusions 152, so that the height of the burrs can be more reliably controlled. The volume of the burr accumulation portion 170 can be roughly calculated in accordance with (the area of the exposed surface 112) x (the height T1 of the stand portion 130). However, how to calculate the volume can be changed as appropriate depending on a shape of the exposed surface 112, a shape of the stand portion 130, or the like.

A ratio between the height T1 of the stand portion 130 and a height T2 of the protrusions 152 (the pressure contact portion 150) can be, for example, 5:1 to 1:1, is preferably 4:1 to 1:1, is more preferably 3:1 to 1:1, and can be, for example, 2:1 to 1:1. If the height T1 of the stand portion 130 is too large with respect to the height T2 of the protrusions 152, a rigidity is reduced, and a durability of the stand portion 130 can be reduced. If the height T1 of the stand portion 130 is too small with respect to the height T2 of the protrusions 152, not preferably, the burrs that are suppressed by the exposed surface 112 easily grow in the horizontal direction and spread in a disorderly manner. The height T2 of the protrusions 152 is a height from the upper surface 131 of the stand portion 130 (the bottom surface 152b of the protrusion 152) to the upper surface 152a of the protrusion 152 (the apex in a case where the protrusion 152 is a pyramid).

There is no particular limitation on the height T1 of the stand portion 130, but the height T1 of the stand portion 130 may be, for example, 0.1 mm or more, and can be 0.3 mm or more. Moreover, the height T1 of the stand portion 130 may be, for example, 1.5 mm or less, and can be 1 mm or less and 0.5 mm or less.

If the height T2 of the protrusions 152 is too small, a contact area of the protrusions 152 and the one of the workpieces to be joined is increased, and a constituent (for example, aluminum) of the workpiece to be joined easily adheres to the protrusions 152. Therefore, the height T2 of the protrusions 152 may be, for example, 0.03 mm or more, and can be 0.1 mm or more and 0.2 mm or more. If the height T2 of the protrusions 152 is too large, a rigidity of the protrusions 152 is reduced, and therefore, a durability of the protrusions 152 is reduced. Therefore, the height T2 of the protrusions 152 may be, for example, 0.3 mm or less, and can be 0.25 mm or less. The height T2 of the protrusions 152 can be changed as appropriate depending on conditions of ultrasonic joining, such as a material and a thickness of each of the workpieces to be joined, and therefore, is not limited to the numerical ranges described above.

As illustrated in FIG. 1 and FIG. 2, the protrusions 152 are disposed so as to adjoin to each other without a flat groove between every adjacent ones of the protrusions. In other words, when viewed from top, the bottom surfaces 152b of the protrusions 152 adjoin to each other without any space between adjacent ones of the bottom surfaces 152b such that the upper surface 131 of the stand portion 130 is not seen between adjacent ones of the protrusions 152. Thus, an amount of the burrs entering between the protrusions 152 can be reduced and the burrs can be more preferably guided to the valley portions of the zigzag portion 154. Disposition of the protrusions 152 is not limited thereto and, for example, the protrusions 152 may be disposed with a gap (groove) between adjacent ones of the protrusions 152.

As illustrated in FIG. 2, in this embodiment, when viewed from top, the exposed surface 112 of the base portion 110 is provided in an entire periphery of the stand portion 130. In other words, the stand portion 130 is formed more inward than an end portion (outer shape) of the upper surface of the base portion 110. Thus, in any direction around the ultrasonic joining portion, the height of the burrs can be preferably controlled.

As illustrated in FIG. 3, a width W1 of the exposed surface 112 may be, for example, ⅓ times or more the height T2 of the protrusions 152, and may be ½ time or more, one time or more, twice or more, or four times or more the height T2 of the protrusions 152. Thus, the burrs can be more reliably accumulated in the burr accumulation portion 170 and the height of the burrs can be preferably controlled. Herein, the width W1 of the exposed surface 112 is a distance from the peripheral wall 132 of the stand portion 130 to the outer shape of the exposed surface when the peripheral wall 132 and the outer shape are perpendicularly connected, and the width W1 can vary for each surface of the peripheral wall 132 (herein, the broad width surfaces 132a and the narrow width surfaces 132b). The width W1 of the exposed surface 112 is not limited to the ratio described above, and can be changed as appropriate depending on the height T1 of the stand portion 130. In other words, the width W1 of the exposed surface 112 may be designed such that the volume of the burr accumulation portion 170 is larger than the overall volume of the protrusions 152 (the pressure contact portion 150).

The width W1 of the exposed surface 112 in the vibration direction is preferably larger than the width of the exposed surface 112 in the perpendicular direction to the vibration direction (in FIG. 2, in the left-right direction). A large number of burrs can be possibly generated in the vibration direction, and therefore, according to a structure described above, the volume of the burr accumulation portion 170 in the vibration direction is increased, so that the burrs can be more reliably controlled.

One embodiment of the horn disclosed herein has been described above. However, the embodiment described above is merely an example and can be implemented in various other embodiments. As other embodiments of the horn 100, a first modified example (horn 100A) and a second modified example (horn 100B) will be described below.

Figure 4:
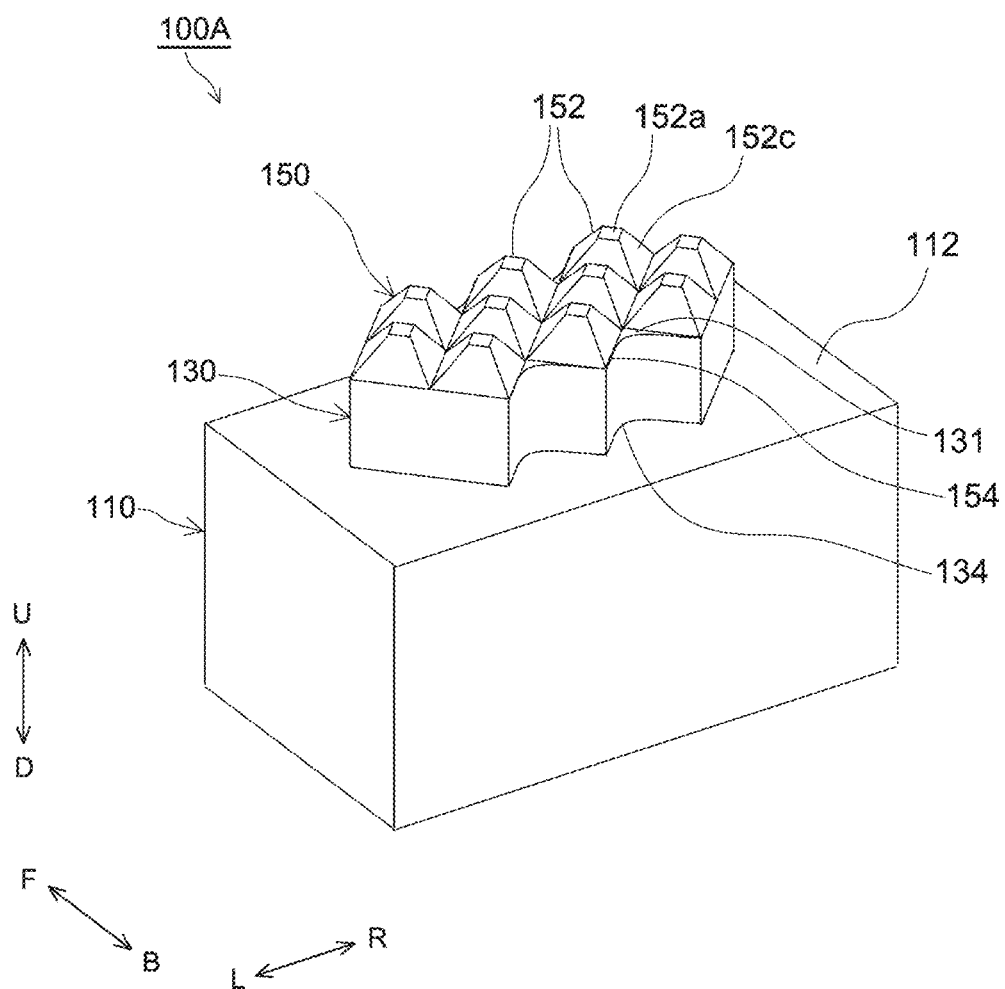
FIG. 4 is a perspective view schematically illustrating a structure of a horn according to a first modified example.
Figure 5:
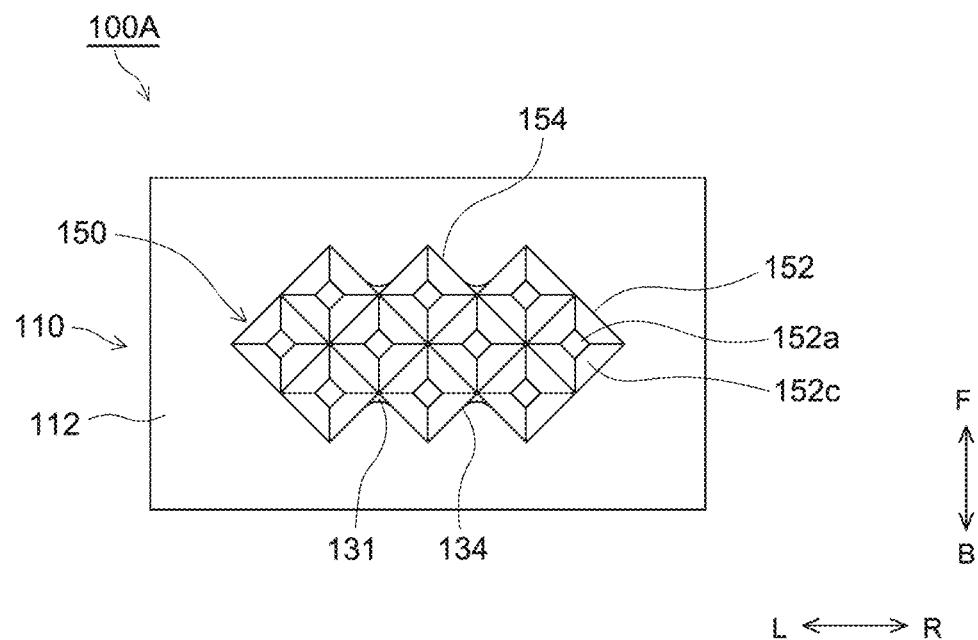
FIG. 5 is a plan view schematically illustrating the structure of the horn according to the first modified example.

FIG. 4 is a perspective view schematically illustrating a structure of the horn 100A. FIG. 5 is a plan view schematically illustrating the structure of the horn 100A. The horn 100A includes a corrugated plate portion 134 formed in a corrugated plate shape at least in a portion of the peripheral wall 132 of the stand portion 130, Herein, the corrugated plate portion 134 is formed in each of the broad width surfaces 132a of the peripheral wall 132. The shape of the corrugated plate portion 134 corresponds to the zigzag portion 154 of the peripheral edge of the portion in which the protrusions 152 are arrayed. In other words, positions of the valley portions of the zigzag portion 154 correspond to positions of recessed portions of the corrugated plate portion 134 of the peripheral wall 132 of the stand portion 130. Thus, the volume of the burr accumulation portion 170 can be increased. Furthermore, according to a structure described above, the burrs guided to the valley portions of the zigzag portion 154 can smoothly enter recesses of the corrugated plate portion 134 of the peripheral wall 132 of the stand portion 130, and therefore, the burrs are guided so as to grow in the height direction (upward). Thus, the burrs easily contact the exposed surface 112, so that the height of the burrs can be more efficiently suppressed. As used herein, the "corrugated plate shape" is a term encompassing a zigzag shape and encompasses a wave-like shape formed by a curved line.

In the horn 100A, when viewed from top, each of the recessed portions of the corrugated plate portion 134 formed in the peripheral wall 132 of the stand portion 130 is formed in a circular arc shape. Thus, sharp burrs are not likely to be formed during ultrasonic joining, and sticking of the burrs can be reduced. As used herein, the "circular arc shape" does not mean only a strict circular arc shape but encompasses a roundish shape without angles (for example, a semielliptical shape, a curved shape, or the like).

A shape of each of the recesses of the corrugated plate portion 134 when viewed from top is not limited to a circular arc shape, and the recess of the corrugated plate portion 134 may be formed into a triangular shape, a quadrangular shape, a polygonal shape, or the like by nothing. The horn 100A is configured such that the upper surface 131 of the stand portion 130 is exposed when viewed from top, but the shape of the zigzag portion 154 of the peripheral edge of the portion in which the protrusions 152 are arrayed may be made to completely correspond to the shape of the corrugated plate portion 134 of the peripheral wall 132 of the stand portion 130 such that the upper surface 131 is not exposed.

Figure 6:
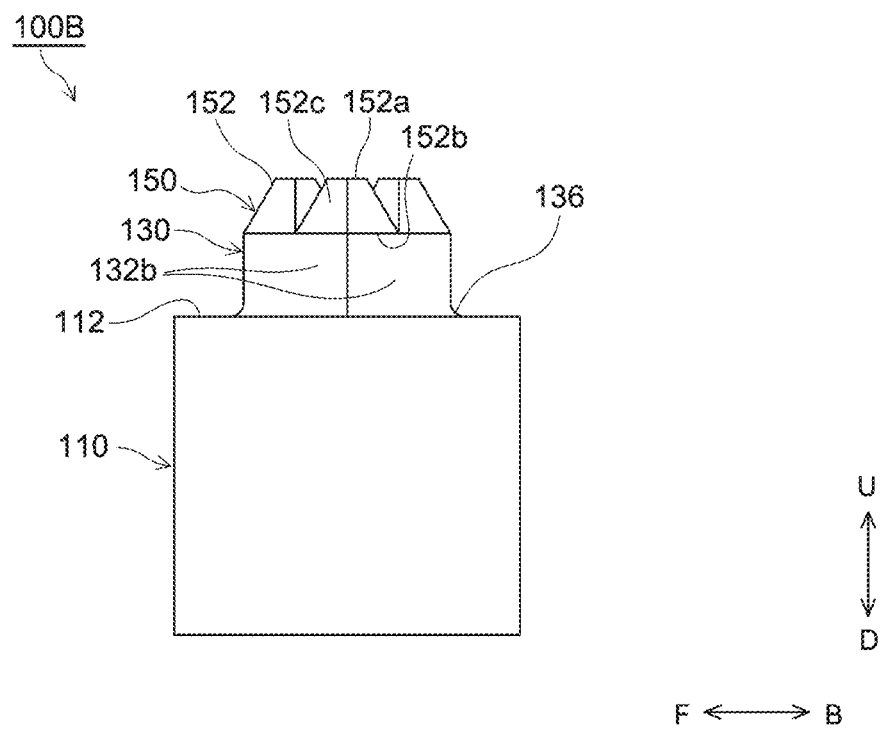
FIG. 6 is a side view schematically illustrating a structure of a horn according to a second modified example.

FIG. 6 is a side view schematically illustrating a structure of a horn 100B. In the horn 100B, a boundary portion between the stand portion 130 and the base portion 110 is formed into a slope portion 136 having a slope shape. In other words, a boundary between the upper surface of the base portion 110 and the peripheral wall 132 of the stand portion 130 is formed so as to be roundish. Thus, when the burrs contact the exposed surface 112, tip ends of the burrs are easily curled, and therefore, sticking of the burrs into the exposed surface 112 can be preferably controlled.

The horns 100A and 100E as modified examples have been described above. However, the horns 100A and 100E are also merely examples and do not limit embodiments of the horn disclosed herein. Moreover, a portion of the embodiment described above can be replaced with some other modified form. For example, in the horns 100 and 100A, the boundary portion between the stand portion 130 and the base portion 110 may be formed in a slope shape.

Regarding to a method for using the horn disclosed herein, production of a terminal component used for a secondary battery will be described below as an example.

Figure 7A:
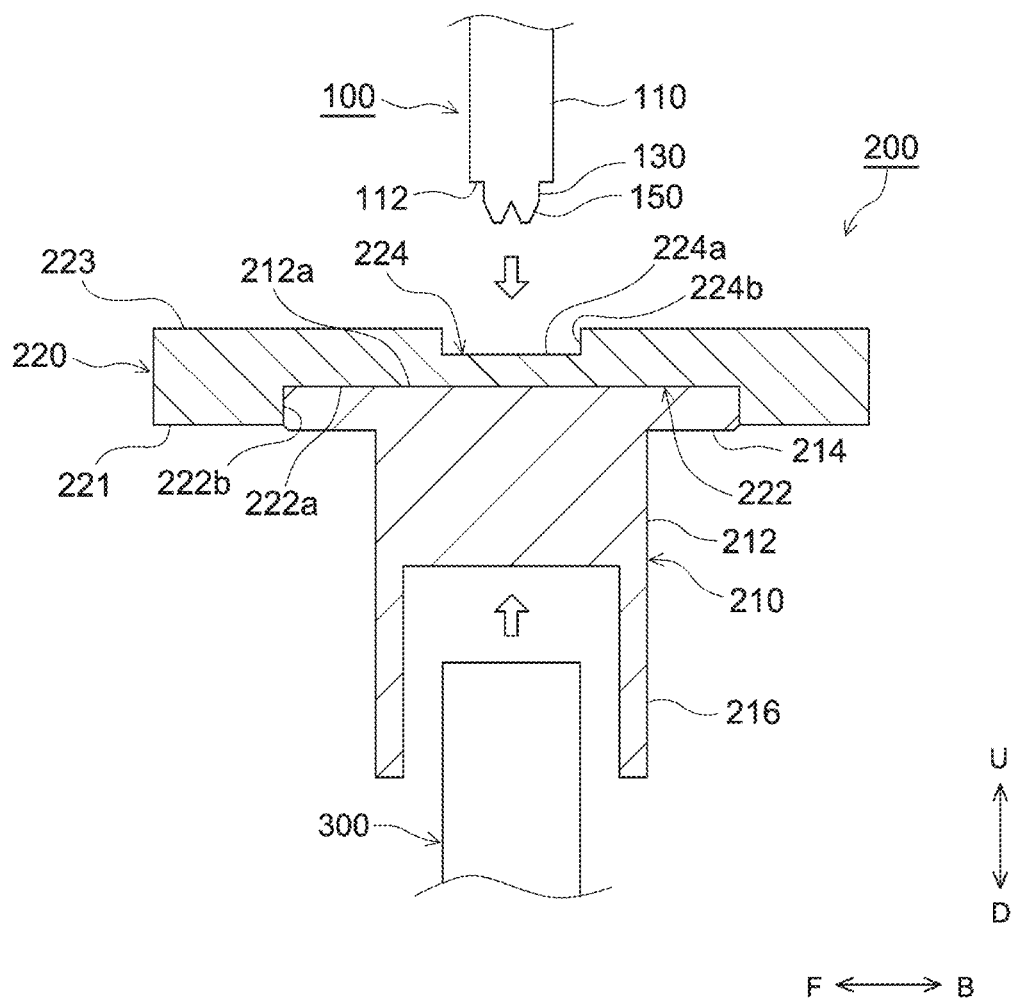
FIG. 7A is a schematic view illustrating a structure of a terminal component before being ultrasonically joined.
Figure 7B:
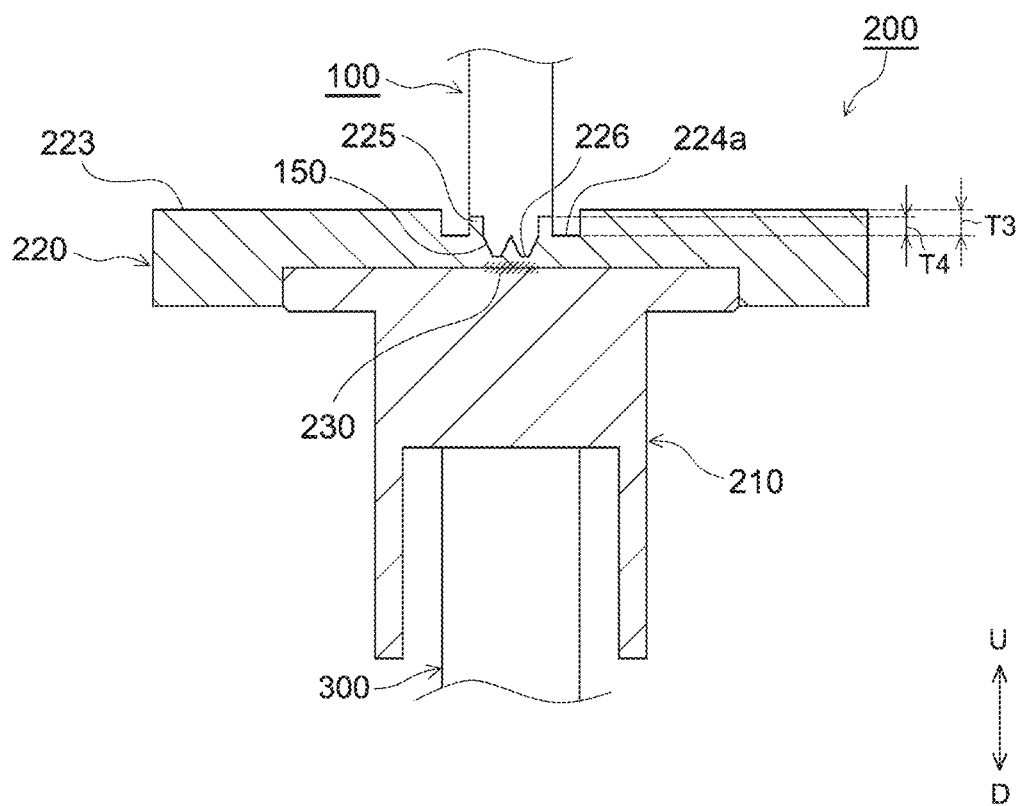
FIG. 7B is a schematic view schematically illustrating steps of ultrasonic joining.

FIG. 7A and FIG. 7B are schematic views roughly illustrating processes of joining a first member 210 and a second member 220 of a terminal component 200 by ultrasonic joining. FIG. 7A is a schematic view illustrating a structure of the terminal component 200 before being ultrasonically joined. FIG. 7B is a schematic view schematically illustrating steps of ultrasonic joining.

As illustrated in FIG. 7A, the terminal component 200 includes the first member 210 and the second member 220 stacked on the first member 210. In this embodiment, the first member 210 is formed of copper. The second member 220 is formed of aluminum.

In this embodiment, the first member 210 includes a shaft portion 212 and a flange portion 214 extending from one end of the shaft portion 212 in an outer diameter direction. An end portion 212a of the first member 210 in a side in which the flange portion 214 is provided has a circular shape. The flange portion 214 is continuously formed in a circumferential direction of the shaft portion 212. An outer edge of the flange portion 214 is formed so as to be perpendicular to the end portion 212a. In the shaft portion 212, a cylindrical portion 216 that is a portion to be caulked to another member is provided in an opposite side to the side in which the flange portion 214 is provided.

In this embodiment, the second member 220 has a plate shape. The second member 220 includes a recessed portion 222 in which the flange portion 214 of the first member 210 is housed on a surface 221 on a side facing the first member 210. The recessed portion 222 has a shape corresponding to an outer shape of the flange portion 214. A bottom portion 222a of the recessed portion 222 has a circular shape corresponding to a shape of the end portion 212a of the first member 210. A side peripheral surface 222b of the recessed portion 222 is formed to extend perpendicular from the bottom portion 222a toward an opening. The second member 220 includes a recessed portion 224 with which the horn 100 is contacted on a surface 223 in an opposite side to the side facing the first member 210. The horn 100 is contacted with a bottom portion 224a of the recessed portion 224. In this embodiment, the recessed portion 224 is formed from the surface 223 by notching into a rectangular parallelepiped shape. A side peripheral surface 224b of the recessed portion 224 is formed to extend perpendicular from the bottom portion 224a toward the opening. A depth T3 of the recessed portion 224 is set to be larger than the height T1 of the stand portion 130 of the horn 100. The depth T3 of the recessed portion 224 refers to a height from the bottom portion 224a of the recessed portion 224 to the surface 223 of the second member 220 and, herein, since the recessed portion 224 is formed in a rectangular parallelepiped shape, the depth T3 of the recessed portion 224 refers to a height from the bottom portion 224a of the side peripheral surface 224b of the recessed portion 224. There is no particular limitation on a shape of the recessed portion 224 and the recessed portion 224 may have a shape, that is, for example, a cubic shape, a hemispherical shape, a columnar shape, a triangular pyramid shape, a rectangular columnar shape, a pyramid shape, a truncated pyramid shape, or the like, in addition to a rectangular parallelepiped shape, obtained by notching.

As illustrated in FIG. 7A and FIG. 7B, ultrasonic joining is performed in a state where the first member 210 and the second member 220 are stacked. The horn 100 is mounted on an ultrasonic oscillator (not illustrated). The horn 100 is pressed against the bottom portion 224a of the recessed portion 224 of the second member 220. On the other hand, an anvil 300 is pressed from a side of the first member 210 in which the cylindrical portion 216 is provided. Thus, the first member 210 and the second member 220 are sandwiched between the horn 100 and the anvil 300 in an up-down direction. Then, the first member 210 and the second member 220 are joined to each other by transmitting ultrasonic vibration generated by the ultrasonic oscillator to the horn 100 and giving the ultrasonic vibration while pressurizing the second member 220 by the horn 100, and thus, the joining portion 230 is formed.

Various conditions of ultrasonic joining are set as appropriate in accordance with metal types of workpieces to be joined (herein, the first member 210 and the second member 202), dimensions, a shape of the horn 100, or the like, and therefore, there is no particular limitation on conditions of ultrasonic joining. For example, in a case where the first member 210 is copper and the second member 202 is aluminum, ultrasonic joining can be performed under conditions under which an amplitude is about 20 μm to 50 μm, a frequency is about 19 kHz to 21 kHz, a load with which the horn 100 is pressed against the workpieces to be joined (the second member 220) is 30 N to 200 N, and an energy amount given to the workpieces to be joined is about 30 J to 200 J.

As illustrated in FIG. 7B, a raised portion 225 formed due to accumulation of the burrs is formed by ultrasonic joining. The pressure contact portion 150 of the horn 100 is pressed against the second member 220 while being pressurized during ultrasonic vibration, and therefore, the pressure contact portion 150 digs into the bottom portion 224a of the recessed portion 224 of the second member 220 and a contact portion 226 is formed in the bottom portion 224a. The contact portion 226 is a cavity formed by imitating a shape of a portion of the pressure contact portion 150 that has dug into the bottom portion 224a. The burrs are formed around the contact portion 226 but the height of the burrs is controlled by the exposed surface 112 of the horn 100. Therefore, a height T4 of the raised portion 225 formed due to accumulation of the burrs is controlled to be equal to or less than the height T1 of the stand portion 130. Thus, the height T4 of the raised portion 225 is controlled so as not to exceed the depth T3 of the recessed portion 224, and therefore, the burrs can be retained in the recessed portion 224. The height T4 of the raised portion 225 is a height from the bottom portion 224a of the recessed portion 224 against which the horn 100 is not pressed.

In the produced terminal component 200, the burrs (the raised portion 225) can be retained in the recessed portion 224, and therefore, the terminal component 200 can be used as a secondary battery without requiring washing treatment for the burrs by joining an external member (for example, a bus bar) thereto to seal the recessed portion 224. A lithium-ion secondary battery 10 will be described below as an example of a secondary battery for which the terminal component 200 can be used.

<Lithium-Ion Secondary Battery 10>

Figure 8:
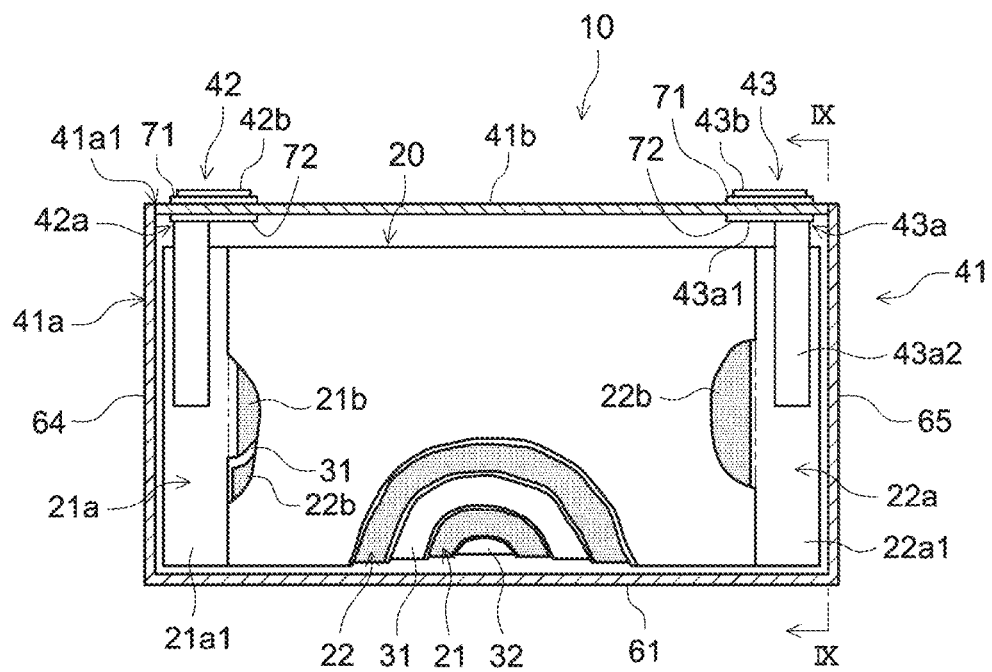
FIG. 8 is a partial cross-sectional view schematically illustrating a structure of a lithium-ion secondary battery.
Figure 9:
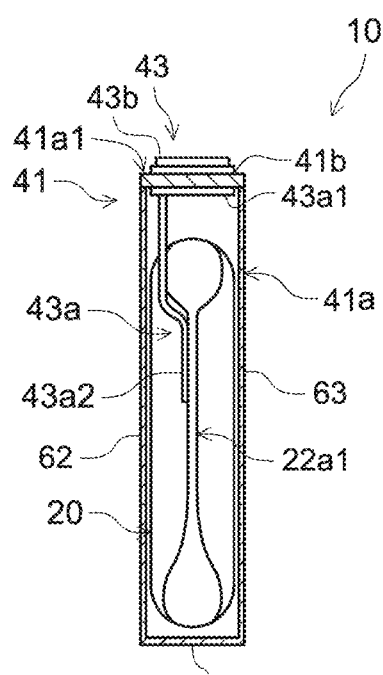
FIG. 9 is a cross-sectional view illustrating a cross section taken along the line IX-IX of FIG. 8.

FIG. 8 is a partial cross-sectional view schematically illustrating a structure of a lithium-ion secondary battery 10. In FIG. 8, a state where an inside of the lithium-ion secondary battery 10 is exposed along a broad width surface on one side of a battery case 41 having an approximately rectangular parallelepiped shape is illustrated. The lithium-ion secondary battery 10 illustrated in FIG. 8 is a so-called sealed battery. FIG. 9 is a cross-sectional view illustrating a cross section taken along the line IX-IX of FIG. 8. In FIG. 9, a partial cross-sectional view in a state where the inside of the lithium-ion secondary battery 10 is exposed along a narrow width surface on one side of the battery case 41 having an approximately rectangular parallelepiped shape is schematically illustrated.

As illustrated in FIG. 8, the lithium-ion secondary battery 10 includes an electrode body 20, the battery case 41, a positive electrode terminal 42, and a negative electrode terminal 43.

<Electrode Body 20>

The electrode body 20 is housed in the battery case 41 in a state where the electrode body 20 is covered by an insulation film (not illustrated) or the like. The electrode body 20 includes a positive electrode sheet 21 as a positive element, a negative electrode sheet 22 as a negative electrode element, and separator sheets 31 and 32 as separators. Each of the positive electrode sheet 21, the first separator sheet 31, the negative electrode sheet 22, and the second separator sheet 32 is a long band-like member.

The positive electrode sheet 21 is configured such that a positive electrode active material layer 21b containing a positive electrode active material is formed on each of both surfaces on a positive electrode current collecting foil 21a (for example, an aluminum foil) having preset width and thickness excluding an unformed portion 21a1 set to have a uniform width in an end portion on one side in a width direction. For example, in a lithium-ion secondary battery, the positive electrode active material is a material, such as a lithium transition metal compound material, that emits lithium ions during charging and absorbs lithium ions during discharging. In general, various other materials than the lithium transition metal compound material have been proposed for positive electrode active materials, and there is no particular limitation on the positive electrode active material used herein.

The negative electrode sheet 22 is configured such that a negative electrode active material layer 22b containing a negative electrode active material is formed on each of both surfaces on a negative electrode current collecting foil 22a (a copper foil herein) having preset width and thickness excluding an unformed portion 22a1 set to have a uniform width in an end portion on one side in the width direction. For example, in a lithium-ion secondary battery, the negative electrode active material is a material, such as natural graphite, that absorbs lithium ions during charging and discharges lithium ions that have been absorbed during charging during discharging. In general, various other materials than the natural graphite have been proposed for negative electrode active materials, and there is no particular limitation on the negative electrode active material used herein.

For each of the separator sheets 31 and 32, for example, a porous resin sheet which has a required heat resistance and through which an electrolyte can pass is used. Various proposals have been made for the separator sheets 31 and 32, and there is no particular limitation on the separator sheets 31 and 32.

Herein, the negative electrode active material layer 22b is formed, for example, to have a width larger than that of the positive electrode active material layer 21b. Each of the separator sheets 31 and 32 has a width larger than that of the negative electrode active material layer 22b. The unformed portion 21a1 of the positive electrode current collecting foil 21a and the unformed portion 22a1 of the negative electrode current collecting foil 22a are disposed to face opposite directions away from each other in the width direction. The positive electrode sheet 21, the first separator sheet 31, the negative electrode sheet 22, and the second separator sheet 32 are stacked in this order and are wound such that directions thereof are aligned in a long-side direction. The negative electrode active material layer 22b covers the positive electrode active material layer 21b with the separator sheets 31 and 32 interposed between the negative electrode active material layer 22b and the positive electrode active material layer 21b. The negative electrode active material layer 22b is covered by the separator sheets 31 and 32. The unformed portion 21a1 of the positive electrode current collecting foil 21a protrudes from one side of the separator sheets 31 and 32 in the width direction. The unformed portion 21a1 of the negative electrode current collecting foil 22a protrudes from the separator sheets 31 and 32 in an opposite side in the width direction.

As illustrate in FIG. 8, the electrode body 20 described above is formed to be flat along a single plane including a winding axis to be housed in a case body 41a of the battery case 41. In an end portion of the winding axis of the electrode body 20, the unformed portion 21a1 of the positive electrode current collecting foil 21a is disposed on one side and the unformed portion 22a1 of the negative electrode current collecting foil 22a is disposed in an opposite side.

<Battery Case 41>

As illustrated in FIG. 8, the battery case 41 houses the electrode body 20 therein. The battery case 41 includes the case body 41a having an approximately rectangular parallelepiped shape with an opening on one side surface and a lid 41b attached to the opening. In this embodiment, from a view point of reducing a weight and ensuring a required rigidity, each of the case body 41a and the lid 41b is formed of aluminum or an aluminum alloy mainly containing aluminum.

<Case Body 41a>

The case body 41a has an approximately rectangular parallelepiped shape with an opening on one side surface. The case body 41a has an approximately rectangular bottom surface portion 61, a pair of broad width surface portions 62 and 63 (see FIG. 9), and a pair of narrow width surface portions 64 and 65. Each of the pair of broad width surface portions 62 and 63 rises from a corresponding longer side of the bottom surface portion 61. Each of the pair of narrow width surface portions 64 and 65 rises from a corresponding shorter side of the bottom surface portion 61. An opening 41a1 surrounded by the pair of broad width surface portions 62 and 63 and the pair of narrow width surface portions 64 and 65 is formed in one side surface of the case body 41a.

<Lid 41b>

The lid 41b is attached to the opening 41a1 of the case body 41a surrounded by longer sides of the pair of broad width surface portions 62 and 63 (see FIG. 9) and shorter sides of the pair of narrow width surface portions 64 and 65. A peripheral portion of the lid 41b is joined to an edge of the opening 41a1 of the case body 41a. The above-described joining may be achieved, for example, by continuous welding without any gap. Such welding can be realized, for example, by laser welding.

In this embodiment, the positive electrode terminal 42 and the negative electrode terminal 43 are mounted on the lid 41b. The positive electrode terminal 42 includes an internal terminal 42a and an external terminal 42b, The negative electrode terminal 43 includes an internal terminal 43a and an external terminal 43b. Each of the internal terminals 42a and 43a is mounted on an inside of the lid 41b via an insulator 72, Each of the external terminals 42b and 43b is mounted on an outside of the lid 41b via a gasket 71. Each of the internal terminals 42a and 43a extends inside the case body 41a. The internal terminal 42a of the positive electrode is connected to the unformed portion 21a1 of the positive electrode current collecting foil 21a. The internal terminal 43a of the negative electrode is connected to the unformed portion 22a1 of the negative electrode current collecting foil 22a.

In the internal terminal 42a of the positive electrode, a required level of oxidation reduction resistance is not as high as that in the negative electrode. In view of the required oxidation reduction resistance and reduction in weight, for example, aluminum can be used for the internal terminal 42a of the positive electrode (see FIG. 8). In contrast, in the internal terminal 43a of the negative electrode, a required level of oxidation reduction resistance is higher than that in the positive electrode. In view of the foregoing, for example, copper can be used for the internal terminal 43a of the negative electrode.

The unformed portion 21a1 of the positive electrode current collecting foil 21a and the unformed portion 22a1 of the negative electrode current collecting foil 22a in the electrode body 20 are mounted on the internal terminals 42a and 43a each being mounted on a corresponding one of both side portions of the lid 41b in a longitudinal direction, respectively, as illustrated in FIG. 8. The electrode body 20 is housed in the battery case 41 so as to be mounted on the internal terminals 42a and 43a each being mounted on the lid 41b. Note that, herein, a wound type electrode body 20 is illustrated as an example. A structure of the electrode body 20 is not limited to the above-described structure. The structure of the electrode body 20 may be, for example, a stacked structure in which a positive electrode sheet and a negative electrode sheet are alternately stacked via a separator sheet therebetween. Plural electrode bodies 20 may be housed in the battery case 41.

The battery case 41 may be configured to house an unillustrated electrolytic solution with the electrode body 20. As the electrolytic solution, a nonaqueous electrolytic solution obtained by dissolving a supporting salt into a non-aqueous solvent may be used. Examples of the non-aqueous solvent include a carbonate base solvent, such as ethylene carbonate, dimethyl carbonate, ethyl methyl carbonate, or the like. Examples of the supporting salt include a fluorine-containing lithium salt, such as $LiPF_6$ or the like.

Figure 10:
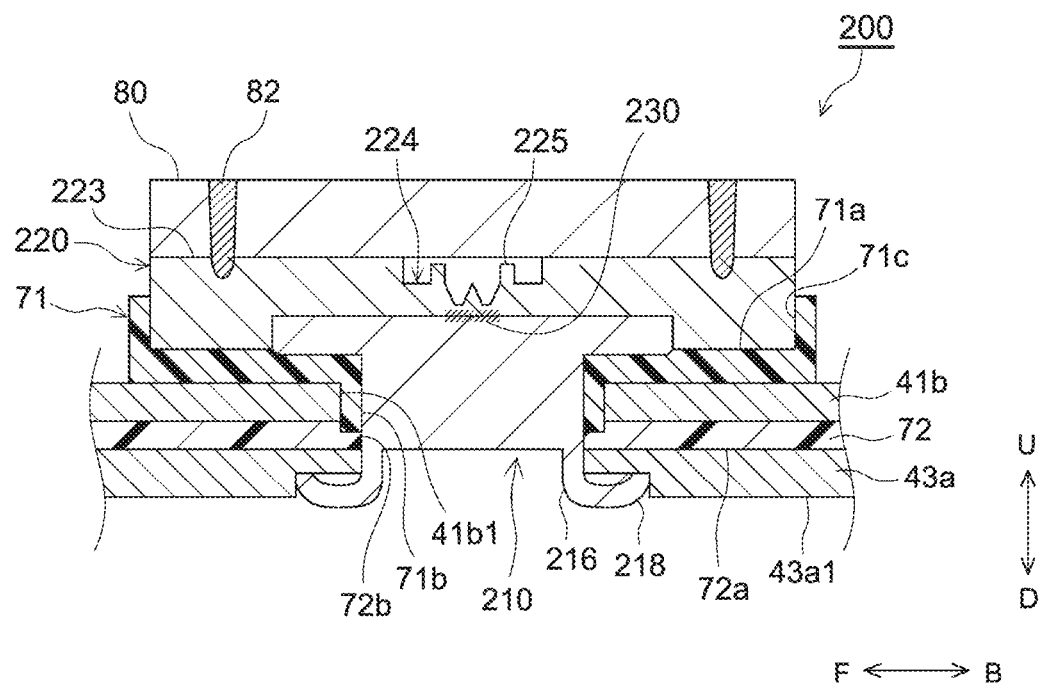
FIG. 10 is a cross-sectional view schematically illustrating a structure when a terminal component produced using a horn according to one embodiment is employed as an external terminal of a negative electrode terminal of a lithium-ion secondary battery.

FIG. 10 is a cross-sectional view schematically illustrating a structure when the terminal component 200 is employed as the external terminal 43b of the negative electrode terminal 43. As illustrated in FIG. 10, the lid 41b includes a mounting hole 41b1 used for mounting the terminal component 200. The mounting hole 41b1 passes through the lid 41b in a preset position of the lid 41b. The internal terminal 43a of the negative electrode and the terminal component 200 are mounted in the mounting hole 41b1 of the lid 41b with the gasket 71 and the insulator 72 interposed therebetween.

Herein, as illustrated in FIG. 10, the terminal component 200 is configured such that the second member 220 is disposed outside the lid 41b. The shaft portion 212 of the first member 210 is mounted to the mounting hole 41b1 via the gasket 71. The cylindrical portion 216 is caulked to the internal terminal 43a of the negative electrode inside the lid 41b to form a stud portion 218 at a tip end of the cylindrical portion 216. Thus, electrical continuity is realized between the terminal component 200 and the internal terminal 43a.

<Gasket 71>

As illustrated in FIG. 10, the gasket 71 is a member mounted in the mounting hole 41b1 and on an outer surface of the lid 41b. In this embodiment, the gasket 71 includes a seating portion 71a, a boss portion 71b, and a side wall 71c. The seating portion 71a is a portion attached to the outer surface of the lid 41b. The seating portion 71a includes an approximately flat surface in accordance with the outer surface of the lid 41b. The boss portion 71b protrudes from a bottom surface of the seating portion 71a. The boss portion 71b has an outer shape along an inner surface of the mounting hole 41b1 so as to be attached to the mounting hole 41b1 of the lid 41b, An inner surface of the boss portion 71b is an attaching hole to which the shaft portion 212 of the first member 210 is attached. The side wall 71c rises upward from a peripheral edge of the seating portion 71a and extends upward. The second member 220 is attached to a portion surrounded by the side wall 71c of the gasket 71.

The gasket 71 is disposed between the lid 41b and the external terminal 43b to ensure insulation between the lid 41b and the terminal component 200. The gasket 71 ensures airtightness of the mounting hole 41b1 of the lid 41b. In view of the foregoing, a material excellent in chemical resistance and weather resistance may be used. In this embodiment, PFA is used for the gasket 71. PFA is a tetrafluoroethylene-perfluoroalkylvinylether copolymer, Note that a material used for the gasket 71 is not limited to PFA.

<Insulator 72>

The insulator 72 is a member attached to the inside of the lid 41b around the mounting hole 41b1 of the lid 41b. The insulator 72 includes a bottom wall 72a and a hole 72b. The bottom wall 72a is a portion disposed along the inner surface of the lid 41b. In this embodiment, the bottom wall 72a is an approximately flat plate-like portion. The bottom wall 72a is disposed along the inner surface of the lid 41b. The hole 72b is a hole provided to correspond to the inner surface of the boss portion 71b of the gasket 71. The insulator 72 is provided inside the battery case 41, and therefore, may have a required chemical resistance. In this embodiment, PPS is used for the insulator 72, PPS is poly phenylene sulfide resin. Note that a material used for the insulator 72 is not limited to PPS.

The internal terminal 43a of the negative electrode includes the base portion 43a1 and a connection piece 43a2 (see FIG. 8 and FIG. 9). The base portion 43a1 is a portion attached to the bottom wall 72a of the insulator 72. The connection piece 43a2 extends from one end of the base portion 43a1, further extends in the case body 41a, and is connected to the unformed portion 22a1 of the negative electrode current collecting foil 22a (see FIG. 8 and FIG. 9).

In this embodiment, the boss portion 71b is attached to the mounting hole 41b1 and the gasket 71 is mounted on the outside of the lid 41b. Next, the terminal component 200 is attached to the gasket 71. At this time, the shaft portion 212 of the first member 210 is inserted through the boss portion 71b of the gasket 71 and the second member 220 is disposed on the seating portion 71a of the gasket 71. Inside the lid 41b, the internal terminal 43a is mounted on the insulator 72. As illustrated in FIG. 10, the cylindrical portion 216 of the first member 210 is bent in the outer diameter direction and is caulked to the internal terminal 43a. The cylindrical portion 216 of the first member 210 and the internal terminal 43a may be partially joined to each other by welding or metal joining in order to improve a conductivity.

As illustrated in FIG. 10, a bus bar 80 as an example of the external member is stacked on the surface 223 in an upper side of the second member 220 of the terminal component 200 and the surface 223 and the bus bar 80 are joined via a welding portion 82. In this embodiment, the welding portion 82 is formed by laser welding. The bus bar 80 is joined to seal the recessed portion 224 of the surface 223 of the second member 220. Thus, the burrs (the raised portion 225) can be sealed in the recessed portion 224, and therefore, the terminal component 200 can be used as a secondary battery without washing the burrs. In this embodiment, the bus bar 80 is formed of aluminum. By forming the bus bar 80 and the second member 220 of the same type of metal, a conductivity and a joining strength are increased. In this embodiment, the bus bar 80 is welded, but the recessed portion 224 may be sealed by some other external member than the bus bar.

In this embodiment, in the terminal component 200, the first member 210 is formed of copper, the second member 220 is formed of aluminum, and the bus bar 80 is formed of aluminum, but the first member 210, the second member 220, and the bus bar 80 are not particularly limited thereto. Each of the first member 210, the second member 220, and the bus bar may be formed of, for example, copper, an alloy containing copper as a main body, aluminum, an alloy containing aluminum as a main body, nickel, of the like. The first member 210 and the second member 220 may be also formed of different metals from each other, and may be formed of the same type of metal. The terminal component 200 can be preferably employed also as the external terminal 42b of the positive electrode terminal 42.

As used herein, the "alloy containing aluminum as a main body" refers to an alloy at least 50% or more of which is aluminum, There is no particular limitation on other elements that can be contained in the aluminum material but, for example, silicon, iron, copper, manganese, magnesium, zinc, chromium, titanium, lead, zirconium, or the like can be contained in the aluminum material. As used herein, the "alloy containing copper as a main body" refers to an alloy at least 50% or more of which is copper. There is no particular limitation on other elements that can be contained in the copper material but, for example, silicon, iron, manganese, magnesium, zinc, chromium, titanium, lead, tin, phosphorus, aluminum, nickel, cobalt, beryllium, zirconium, or the like can be contained in the copper material.

An example of use of the horn 100 disclosed herein has been described above using production of the terminal component 200 as an example. However, application of the horn 100 is not limited to production of the terminal component 200.

As will be described below, as specific examples, test pieces that simulated the terminal component disclosed herein were produced and the joining strength of the joining portion was evaluated, Note that it is not intended to limit the technology disclosed herein to the examples.

First Example

A test piece formed of copper and having a similar shape to that of the first member 210 and a test piece formed of aluminum and having a similar shape to that of the second member 220 were prepared. The test piece formed of aluminum was stacked on the test piece formed of copper and the stacked pieces were fixed to an anvil. A horn was mounted on an ultrasonic oscillator. Herein, the horn having a similar shape to that of the horn 100 illustrated in FIG. 1 to FIG. 3 was used. The horn configured such that the height T1 of the stand portion 130 was 0.2 mm, the height T2 of the protrusions 152 was 0.2 mm (that is, T1:T2=1:1) and the shortest width W1 of the exposed surface 112 was approximately twice as large as T2 was prepared. A pressure contact portion of the horn was contacted with a bottom of a recessed portion of the test piece formed of aluminum and ultrasonic joining was performed under conditions where an amplitude was 20 μm, a frequency was 20 kHz, and an energy amount was 100 J while pressurizing them with a load of 100 N. Thus, an evaluation terminal component of a first example was produced.

Second Example

Using a horn having the same structure as the structure of the horn used in the first example except that the shortest width W1 of the exposed surface 112 was one time as large as the height T2 of the stand portion 130, an evaluation terminal component of a second example was produced in a similar manner to that in the first example.

First Comparative Example

Figure 11:
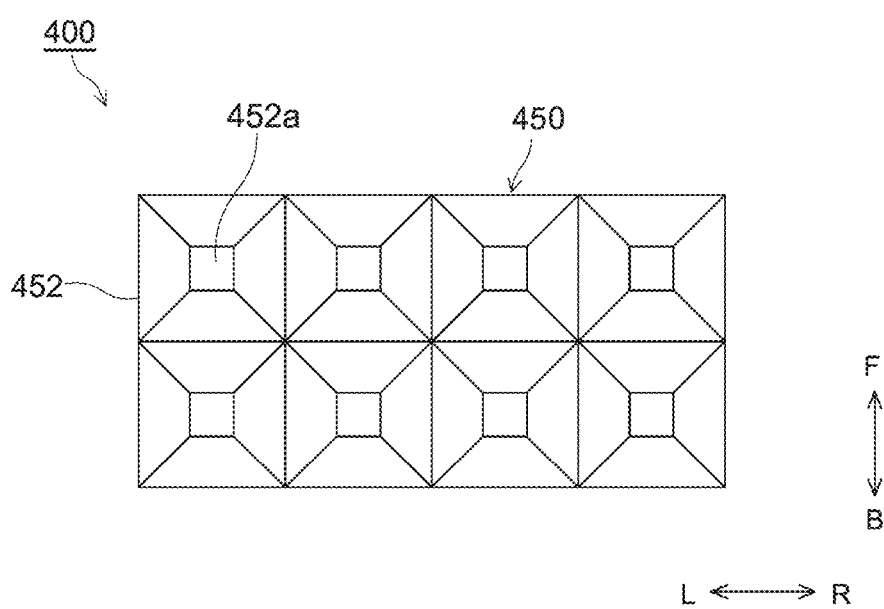
FIG. 11 is a plan view schematically illustrating a structure of a horn used in a first comparative example.

FIG. 11 is a plan view schematically illustrating a structure of an ultrasonic joining horn 400 (which will be hereinafter also referred to as a "horn 400") used for producing a first comparative example. In FIG. 11, a shape of a pressure contact portion 450 of the horn 400 that is contacted with a workpiece to be joined is illustrated. As illustrated in FIG. 11, the pressure contact portion of the horn 400 is formed of eight protrusions 452. Each of the protrusions 452 has a truncated quadrangular pyramid shape having a square upper surface 452a and a square bottom surface. The protrusions 452 are disposed such that bottom surfaces of adjacent ones of the protrusions 452 adjoin to each other without any space therebetween. In the horn 400, the protrusions 452 are formed to rise from a surface of a base portion and the horn 400 does not include a stand portion.

In the first comparative example, an evaluation terminal component of the first comparative example was produced in a similar manner to that in the first example except that the horn 400 was used.

<Measurement of Shapes of Burrs>

Figure 12A:
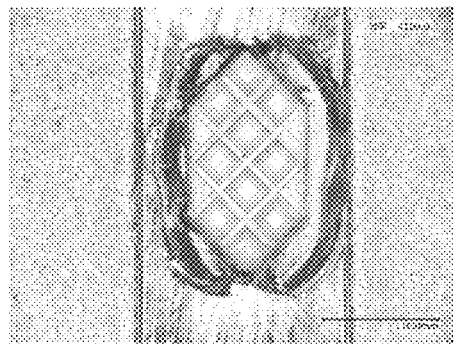
FIG. 12A is an image illustrating a shape of a portion around an ultrasonic joining portion of an evaluation terminal component of a first example.
Figure 12B:
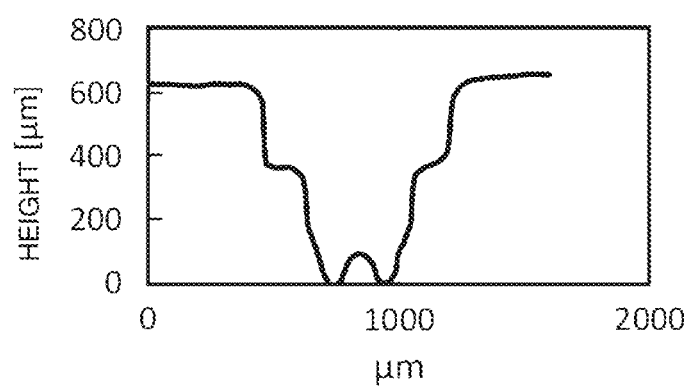
FIG. 12B is a graph illustrating a shape of a cross section of the evaluation terminal component of the first example.
Figure 13A:
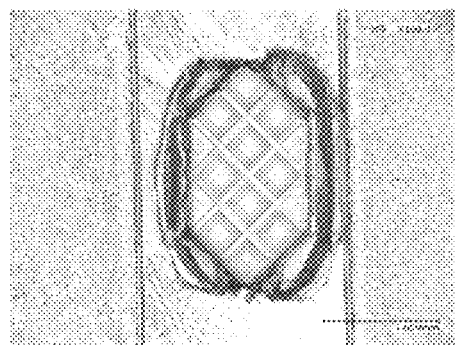
FIG. 13A is an image illustrating a shape of a portion around an ultrasonic joining portion of an evaluation terminal component of a second example.
Figure 13B:
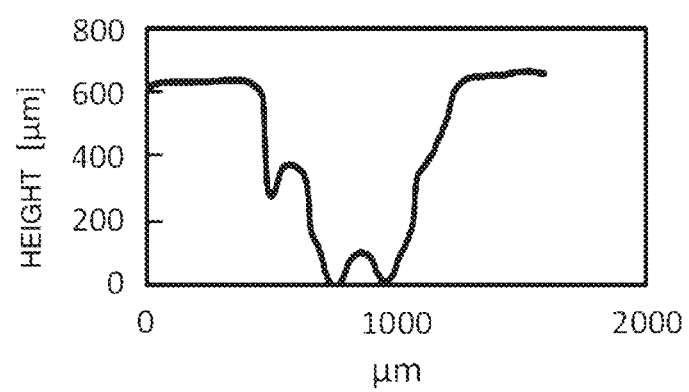
FIG. 13B is a graph illustrating a shape of a cross section of the evaluation terminal component of the second example.
Figure 14A:
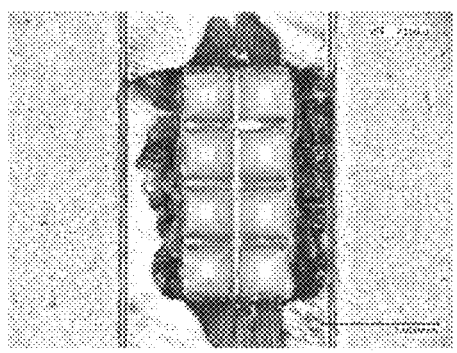
FIG. 14A is an image illustrating a shape of a portion around an ultrasonic joining portion of an evaluation terminal component of the first comparative example.
Figure 14B:
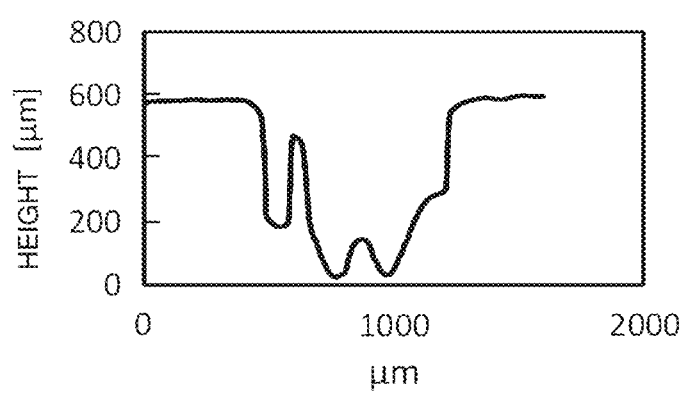
FIG. 14B is a graph illustrating a shape of a cross section of the evaluation terminal component of the first comparative example.

For the evaluation terminal components of the examples, in order to observe shapes of burrs around the ultrasonic joining portion, a cross-sectional shape of a portion near the joining portion was analyzed by a non-contact 3D measurement system VR-5000 (manufactured by Keyence Corporation). Each cross section was formed along a vibration direction of ultrasonic vibration. FIG. 12A is an image illustrating a shape of a portion around an ultrasonic joining portion of the evaluation terminal component of the first example (around a portion in which the pressure contact portion of the horn was pressed). FIG. 12B is a graph illustrating a shape of a cross section of the evaluation terminal component of the first example. FIG. 13A is an image illustrating a shape of a portion around an ultrasonic joining portion of the evaluation terminal component of the second example. FIG. 13B is a graph illustrating a shape of a cross section of the evaluation terminal component of the second example. FIG. 14A is an image illustrating a shape of a portion around an ultrasonic joining portion of the evaluation terminal component of the first comparative example. FIG. 14B is a graph illustrating a shape of a cross section of the evaluation terminal component of the first comparative example, Each of FIG. 12A, FIG. 13A, and FIG. 14A is an image of the portion around the ultrasonic joining portion of a corresponding one of the test pieces formed of aluminum photographed when viewed from top. In each of FIG. 12A, FIG. 13A, and FIG. 14A, the vibration direction of ultrasonic vibration is an arrow direction.

In comparison among FIG. 12A, FIG. 13A and FIG. 14A, it was observed that, in the first comparative example, burrs were formed around the ultrasonic joining portion in a disorderly manner (see FIG. 14A), whereas it was observed that, in each of the first example and the second example in which the horns disclosed herein were used, burrs around the ultrasonic joining portion were controlled and accumulated (see FIG. 12A and FIG. 13A).

In the graphs illustrated in FIG. 12B, FIG. 13B, and FIG. 14B, a height around 600 μm indicates a height of a surface of a workpiece to be joined and a height around 0 to 100 μm indicates a shape with protrusions that dug into the test piece. As illustrated in FIG. 12B, it is understood that, in the first example, a step (raised portion) formed due to accumulation of burrs around a height of around 400 μm and having a substantially flat upper surface was formed around the ultrasonic joining portion. Moreover, as illustrated in FIG. 13B, it is understood that, also in the second example, a stepped shape (raised portion) formed due to accumulation of burrs was formed around the ultrasonic joining portion. On the other hand, it is understood from FIG. 14B that relatively sharp burrs formed so as to deviate to one side (left side in the graph) around the ultrasonic joining portion existed.

Based on the foregoing, it is understood that a height of burrs formed around an ultrasonic joining portion can be preferably controlled by using a horn disclosed herein. Moreover, it is also understood that spreading of burrs in a disorderly manner is suppressed and step-like raised portions are formed due to controlled burrs.

Specific examples of the technology disclosed herein have been described in detail above, but these are merely examples and do not limit the scope of the claims. The technology disclosed herein includes various modifications and changes of the specific examples described above.

What is claimed is:

1. An ultrasonic joining horn that can generate ultrasonic vibration in a predetermined vibration direction, the ultrasonic joining horn comprising:
   a base portion;
   a stand portion that rises from an upper surface of the base portion; and
   a pressure contact portion formed of a plurality of protrusions that protrude from an upper surface of the stand portion, wherein
   each of the protrusions forming the pressure contact portion is formed into a pyramid shape or a truncated pyramid shape and the protrusions are arrayed,
   when viewed from an upper side looking toward a lower side, at least a portion of a peripheral edge of a portion in which the protrusions are arrayed has a zigzag shape,
   the zigzag portion is formed along at least one of the vibration direction and a perpendicular direction to the vibration direction,
   the upper surface of the base portion has an exposed surface on which the stand portion is not formed;
   a portion of a peripheral wall of the stand portion is formed in a corrugated plate shape, and
   the portion of the peripheral wall of the stand portion having the corrugated plate shape corresponds to the zigzag portion of the peripheral edge of the portion in which the protrusions are arrayed.

2. The ultrasonic joining horn according to claim 1, wherein
   when viewed from the upper side looking toward the lower side, a recessed portion of the portion having the corrugated plate shape formed in the peripheral wall of the stand portion is formed in a circular arc shape.

3. The ultrasonic joining horn according to claim 1, wherein
   the protrusions are disposed so as to adjoin to each other without a flat groove between every adjacent ones of the protrusions.

4. The ultrasonic joining horn according to claim 1, wherein
   when viewed from the upper side looking toward the lower side, the peripheral edge of the portion in which the protrusions are arrayed does not have any one of a side extending in the vibration direction and a side extending in the perpendicular direction to the vibration direction.

5. The ultrasonic joining horn according to claim 1, wherein
   when viewed from the upper side looking toward the lower side, the exposed surface is provided in an entire periphery of the stand portion.

6. The ultrasonic joining horn according to claim 1, wherein
   a boundary portion between the upper surface of the base portion and the peripheral wall of the stand portion is formed in a slope shape.

7. The ultrasonic joining horn according to claim 1, wherein
   a ratio between a height (T1) of the stand portion from the upper surface of the base portion and a height (T2) of the protrusions from the upper surface of the stand portion is 5:1 to 1:1.

* * * * *